Figure 1:
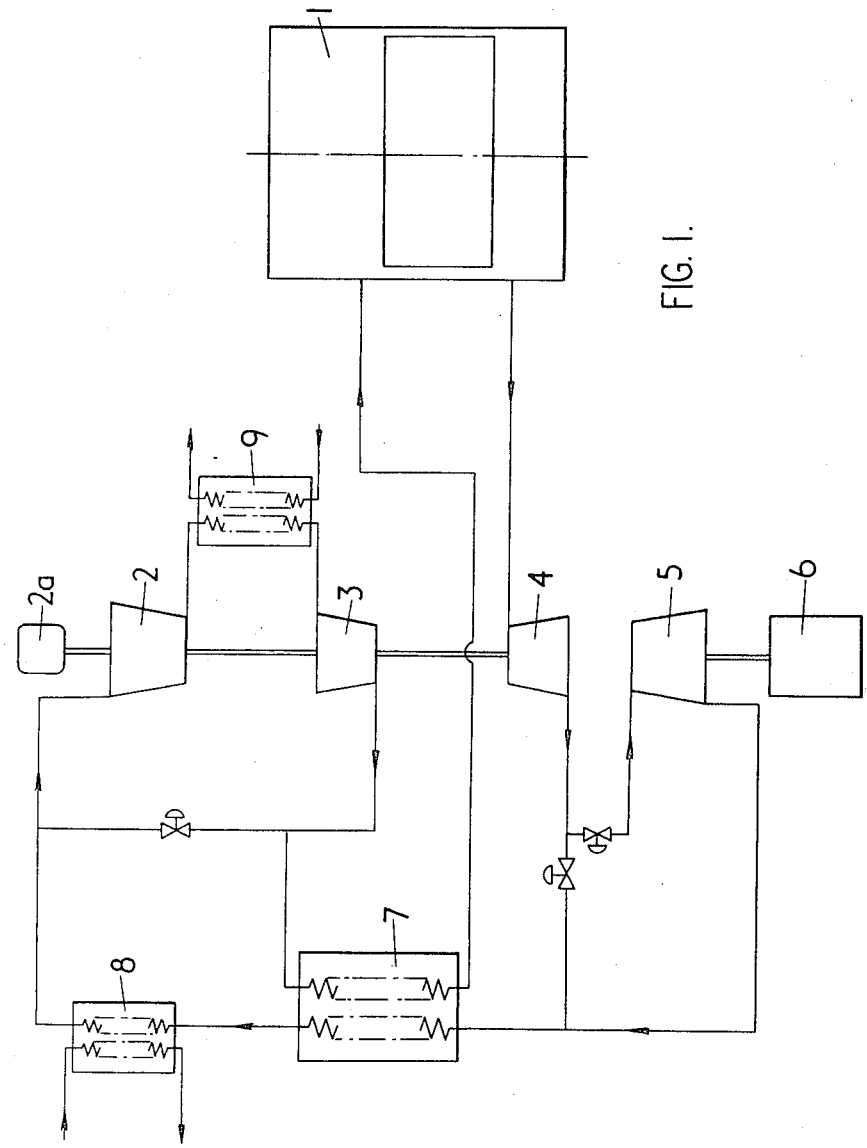

United States Patent
Thompson et al.

[15] 3,663,364
[45] May 16, 1972

[54] NUCLEAR REACTORS OPERATING IN CONJUNCTION WITH GAS TURBINES

[72] Inventors: John Thompson; Roger Davison Vaughan, both of Knutsford, England

[73] Assignee: The Nuclear Power Group Limited, Knutsford, Cheshire, England

[22] Filed: Sept. 23, 1969

[21] Appl. No.: 860,188

[52] U.S. Cl. ................176/65, 176/60, 176/58, 176/87
[51] Int. Cl. .................G21c 15/28, G21d 1/02
[58] Field of Search........176/50, 58, 59, 60, 65, 87

[56] References Cited

UNITED STATES PATENTS

| | | | |
|---|---|---|---|
| 3,178,354 | 4/1965 | Vann et al. | 176/59 X |
| 3,365,366 | 1/1968 | Cundill | 176/59 X |
| 3,371,017 | 2/1968 | Coast et al. | 176/60 X |
| 3,410,091 | 11/1968 | Frutschi | 176/65 X |
| 3,444,038 | 5/1969 | Schabert | 176/65 X |

FOREIGN PATENTS OR APPLICATIONS

| | | | |
|---|---|---|---|
| 1,185,261 | 2/1959 | France | 176/60 |

*Primary Examiner*—Carl D. Quarforth
*Assistant Examiner*—E. E. Lehmann
*Attorney*—Holman & Stern

[57] ABSTRACT

A thermal power plant employing a gas cooled nuclear reactor comprising a closed cycle gas turbine plant having at least one compressor driven by at least one compressor turbine, at least one work turbine mechanically separate from the compressor turbine and coupled to an electrical generator, and at least one heat exchanger for heating the working fluid, the plant incorporating duct means for conveying the working fluid in a closed path through the compressor, through one side of a heat exchanger, through the nuclear reactor, through the compressor turbine, through the work turbine and thence through the other side of the heat exchanger before re-entering the compressor, the arrangement being that the compressor turbine and compressor are arranged vertically within a first cavity in a concrete pressure vessel, the heat exchanger is arranged in a second vertical cavity within the pressure vessel and the reactor core within a third vertical cavity, extending transversely across the vessel with respect to the other cavities, the four cavities being interconnected for the passage of working fluid through the gas turbine plant and reactor core.

4 Claims, 4 Drawing Figures

FIG. I.

INVENTORS
JOHN THOMPSON
ROGER DAVISON VAUGHAN

NUCLEAR REACTORS OPERATING IN CONJUNCTION WITH GAS TURBINES

This invention relates to thermal power plant employing nuclear reactors.

As the operating temperature of nuclear reactors is increased, the use of gas turbines to convert the heat developed in the reactor into useful work becomes increasingly attractive. The smaller size of a gas turbine plant and the fact that steam boilers are eliminated can result in substantial savings in capital cost.

In a typical arrangement, the gas turbine plant would comprise one or more compressors driven by one or more turbines usually called the compressor turbine or turbines and one or more turbines connected to an electrical generator but not mechanically connected to the compressor turbine. Such turbines are usually referred to as 'work turbines'. For the reactor application, a closed cycle is usually preferred in which gas from the compressors is conveyed first to a heat exchanger where it is heated by exhaust gas from the work turbine or turbines and then is heated further in the reactor before expansion in the compressor turbine or turbines and the work turbine or turbines. The gas leaving the work turbines passes to the aforementioned heat exchanger, where it gives up its heat to the compressed gas on its way to the reactor, before finally being returned to the compressor inlet. Any heat still in the exhaust gas leaving the heat exchanger can be removed in a further heat exchanger by a separate cooling fluid prior to the air returning to the compressor. Such a cycle is typical of many well-known closed cycle gas turbine plants the only difference being that the nuclear reactor replaces the combustion chamber of the more conventional plant.

An object of the present invention is to provide a thermal power plant incorporating a gas turbine plant of the kind described in the preceding paragraph for operation in conjunction with a nuclear reactor of the gas-cooled type in which the number of ducts interconnecting the various operating members of the plant is kept to a minimum and access is provided for removal of components with minimum number and size of vessel penetrations.

According to the present invention, a thermal power plant employing a gas cooled nuclear reactor comprises a closed cycle gas turbine plant having at least one compressor driven by at least one compressor turbine, at least one work turbine mechanically separate from the compressor turbine and coupled to an electrical generator, and at least one heat exchanger for heating the working fluid, the plant incorporating duct means for conveying the working fluid in a closed path through the compressor, through one side of a heat exchanger, through the nuclear reactor, through the compressor turbine, through the work turbine and thence through the other side of the heat exchanger before re-entering the compressor, the arrangement being that the compressor turbine and compressor are arranged vertically within a first cavity in a concrete pressure vessel, the heat exchanger is arranged in a second vertical cavity within the pressure vessel and the reactor core within a third vertical cavity, the work turbine and generator being located in a fourth cavity extending transversely across the vessel with respect to the other cavities, the four cavities being interconnected for the passage of working fluid through the gas turbine plant and reactor core.

The invention also consists in a thermal power plant in accordance with the preceding paragraph in which there are two compressor sets arranged alongside one another in a single cavity, each compressor set comprising at least one compressor driven by at least one compressor turbine.

The invention also consists in a thermal power plant in accordance with either of the preceding two paragraphs in which the cavities are located within a region enclosed by the wall of the concrete pressure vessel.

Figure 2:
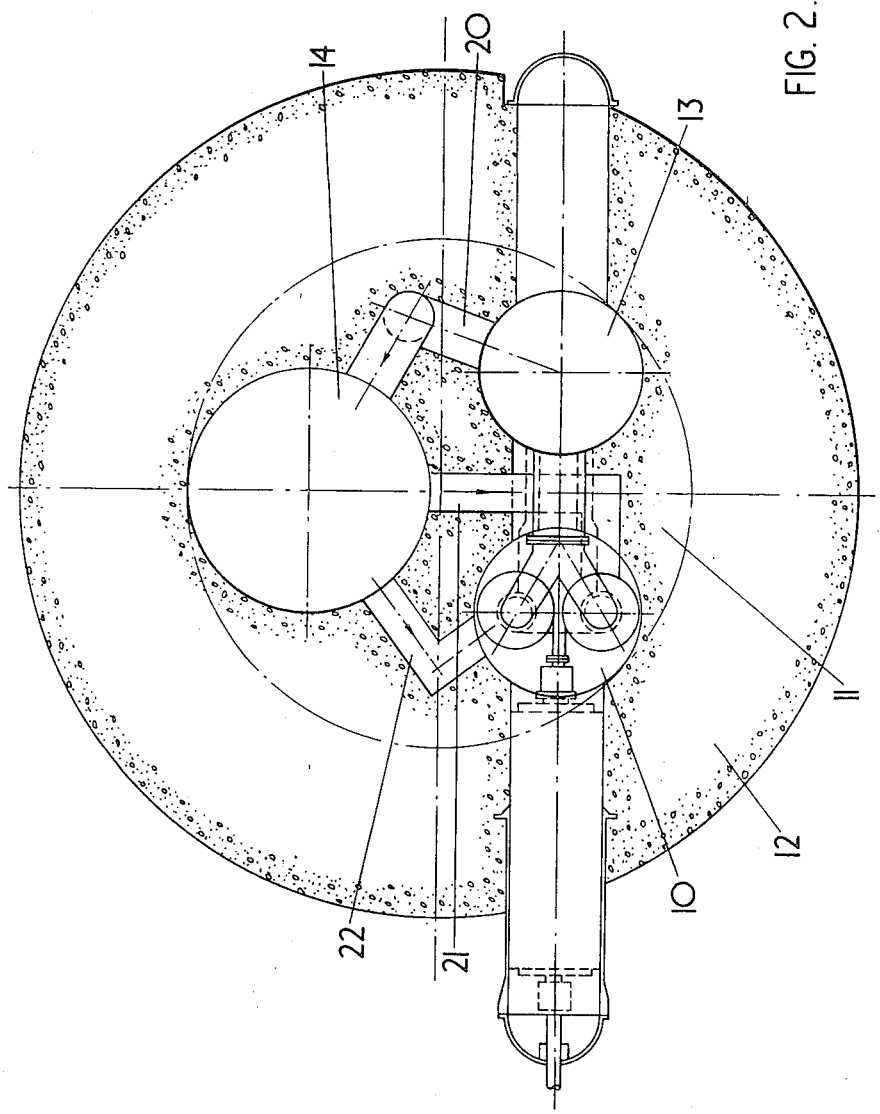
Figure 3:
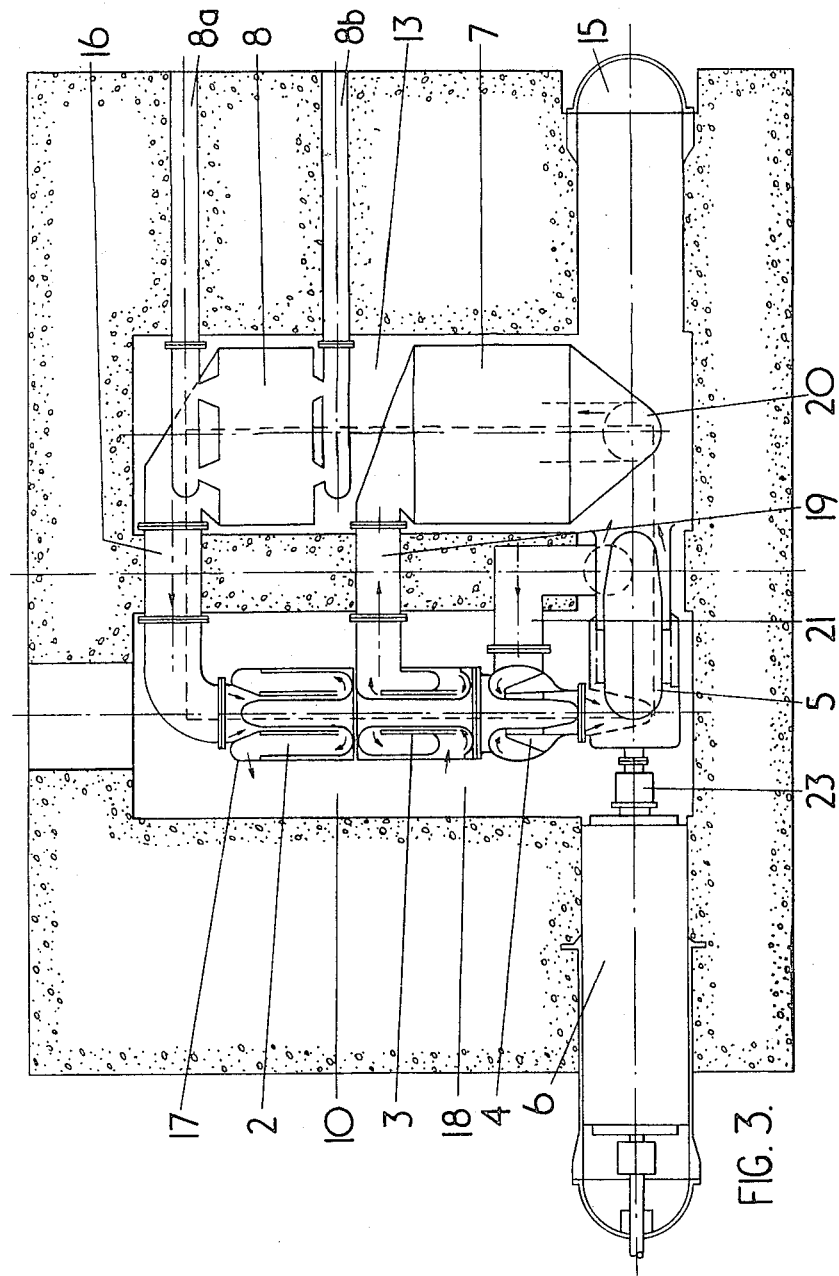
Figure 4:
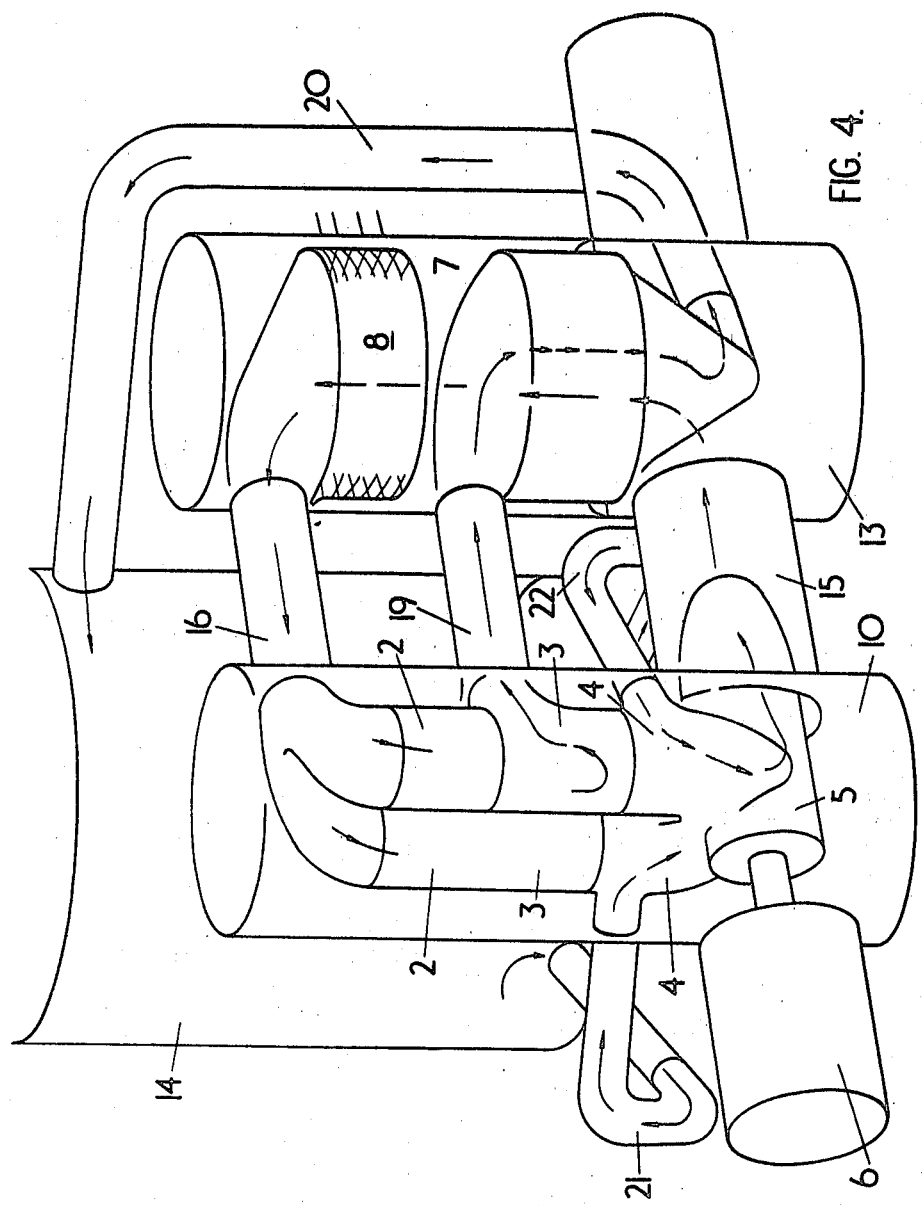

The invention also consists in a thermal power plant substantially as described herein with reference to any of the accompanying drawings in which:

FIG. 1 shows diagrammatically a typical closed cycle thermal power plant in accordance with the invention, FIG. 2 is a sectional plan view of a concrete pressure vessel showing the cavities with the vessel housing components of the gas turbine plane in accordance with one embodiment of the invention, but with details of heat exchangers and the reactor core omitted for the sake of clarity, FIG. 3 is a section on line AA of FIG. 1, FIG. 4 is a diagrammatic perspective view of the duct arrangements.

In carrying the invention into effect in the forms illustrated by way of example and referring first to FIG. 1, a thermal power plant comprises a nuclear reactor 1 and a closed cycle gas turbine plant the working fluid of which is heated by the reactor. The gas turbine plant in the embodiment shown comprises a low pressure compressor 2 and a high pressure compressor 3 directly coupled to the compressor 2. Driving the compressors 2 and 3 is a compressor turbine 4.

A work turbine 5 mechanically separate from the turbine 4 drives an electrical generator 6.

The turbine 4 and compressors 2 and 3 form a compressor set which is capable of being rotated for starting purposes by starting motor 2a.

Working fluid leaving the turbine 5 is conveyed to heat exchanger 7 and then passes to a further heat exchanger 8 before returning to the compressor 2. An intercooler 9 is arranged between the compressors 2 and 3 to remove the heat of compression 2 from the working fluid before it enters compressor 3.

In operation, working fluid which may, for example, be helium or carbon dioxide, is compressed in compressor 2, cooled in intercooler 9, compressed further in compressor 3, heated in heat exchanger 7 by working fluid leaving turbine 5, heated further in the reactor 1 and then expanded first in turbine 4 and then in turbine 5. After leaving turbine 5 the working fluid passes to heat exchanger 7 where it gives up heat to working fluid on its way to the reactor, and then enters further heat exchanger 8 where any remaining heat content is removed by a cooling fluid such as water. The working fluid then returns to the compressor 2 to start the cycle once more.

Referring to FIGS. 2, 3 and 4, the compressor set is located in one vertical cavity 10 within a region 11 enclosed by the wall 12 of a concrete pressure vessel which may be a prestressed concrete vessel of the kind normally used with gas cooled reactors. The region 11 may, as shown, be filled with concrete, the cavities being formed in the concrete. Such concrete provides shielding between the core and the gas turbine plant. In another cavity 13 are located the heat exchangers 7 and 8, not shown in FIG. 2, in a third cavity 14 the reactor core 1a (not shown in FIG. 2) and in a fourth cavity 15 (see FIG. 3), which is disposed transversely with respect to the cavities 10 and 13, are disposed the work turbine 5 and electrical generator 6.

The cavity 15 preferably intersects the cavities 10 and 13 to reduce the number of interconnecting ducts required.

In the embodiment shown two compressor sets are located in cavity 10 but this is not essential; a single set can be used if desired to suit power requirements.

The interconnection between compressor 2 and heat exchanger 8 is by means of duct 16. The flow of cooling fluid leaving compressor 2 is reversed to flow in an annulus in the casing to the inlet 17 to intercooler 9 which, although not shown in FIG. 2, lies above or alongside the compressors 2 and 3 in cavity 10. The working fluid leaves the intercooler from outlet 18 and enters compressor 3.

Duct 19 connects the compressor 3 with heat exchanger 7 and duct 20 connects heat exchanger 7 with the reactor core cavity 14.

Working fluid from the reactor flows by way of ducts 21 and 22 to the cavity 10 and the compressor turbine 4.

The casing of the turbine 4 is connected to the casing of work turbine 5 and the working fluid leaving turbine 5 enters cavity 15 and can flow into heat exchanger 7 and thence into pre-cooler 8. Connections for cooling water to the heat exchanger 8 are shown at 8a and 8b.

The generator and power turbines are on a horizontal shaft and can be removed through cavity 15 for repair. The generator can be located wholly within the reactor vessel or outside the reactor vessel.

The compressor set or sets can also be removed from cavity 10 for repair.

We claim:

1. A thermal power plant employing a gas cooled nuclear reactor comprising a closed cycle gas turbine plant having at least one compressor driven by at least one compressor turbine, at least one work turbine mechanically separate from the compressor turbine and coupled to an electrical generator, and at least one heat exchanger for heating the working fluid, the plant incorporating duct means for conveying the working fluid in a closed path through the compressor, through one side of a heat exchanger, through the nuclear reactor, through the compressor turbine, through the work turbine and thence through the other side of the heat exchanger before re-entering the compressor, the arrangement being that the compressor turbine and compressor are arranged vertically within a first cavity in a concrete pressure vessel, the heat exchanger is arranged in a second vertical cavity within the pressure vessel and the reactor core within a third vertical cavity, the work turbine and generator being located in a fourth cavity extending transversely across the vessel with respect to the other cavities, the four cavities being interconnected for the passage of working fluid through the gas turbine plant and reactor core.

2. A thermal power plant according to claim 1, in which there are two compressor sets arranged alongside one another in a single cavity, each compressor set comprising at least one compressor driven by at least one compressor turbine.

3. A thermal power plant according to claim 1, in which the cavities are located within a space enclosed by the wall of the concrete pressure vessel.

4. A thermal power plant according to claim 1, in which the fourth cavity intersects the first and second cavities.

* * * * *